United States Patent [15] 3,688,142
Förste et al. [45] Aug. 29, 1972

[54] COLLECTOR RING BODIES FOR ELECTRIC MOTORS

[72] Inventors: Walter Förste, Suhl Thuringin; Hans-Joachim Teuschler, Berlin; Joachim Schreiber, Berlin, all of Germany

[73] Assignee: VVB Elektrische Konsumguter, Berlin, Germany

[22] Filed: Dec. 16, 1970

[21] Appl. No.: 98,755

[52] U.S. Cl. ............................................. 310/232
[51] Int. Cl. .............................................. H01r 39/08
[58] Field of Search......310/232, 219, 223, 224, 233, 310/234, 235, 236, 238, 239

[56] References Cited

UNITED STATES PATENTS

| 1,870,236 | 8/1932 | Chervenka | 310/232 |
| 3,091,714 | 5/1963 | Jernberg | 310/232 |
| 1,991,057 | 2/1935 | McCloskey | 310/234 |
| 2,322,011 | 6/1943 | French | 310/232 |

FOREIGN PATENTS OR APPLICATIONS

| 902,557 | 9/1945 | France | 310/232 |
| 932,810 | 9/1955 | Germany | 310/232 |
| 894,586 | 9/1953 | Germany | 310/232 |
| 1,277,426 | 9/1958 | Germany | 310/232 |

Primary Examiner—J. D. Miller
Assistant Examiner—R. S. Skudy
Attorney—Tab T. Thein

[57] ABSTRACT

Collector ring bodies for encased high-speed electric motors, having a cylindrical hub of an insulating material, at least two non-metallic collector rings on the hub, and caps or sleeves for securing the rings to the hub, wherein either the hub or the securing elements, or both, are made from a material such as beryllium-oxide containing cements, thermosetting or thermoplastic materials, which provide good heat dissipation as well as electrical insulation.

13 Claims, 11 Drawing Figures

INVENTORS
WALTER FÖRSTE
HANS-JOACHIM TEUSCHLER
JOACHIM SCHREIBER

BY *Jab Flein*
AGENT

COLLECTOR RING BODIES FOR ELECTRIC MOTORS

The invention relates to collector ring bodies for high-speed electric motors of encased construction and having collector rings made from non-metallic materials.

Collector ring bodies are well known for electric motors having rings of non-metallic materials, for example carbon. One kind of such bodies is constructed by embedding their collector rings in cast resin. Such embedded carbon collector rings may however be burst open during the operation of the electric motor on account of the different expansion coefficients of the two materials, whereby the entire collector ring body is put out of service.

As a preventive measure the contact surfaces of the cast-resin body and of the carbon collector rings were provided with a coating that acts as a lubricant, which however can technically be realized only by using procedures that require considerable equipment.

Particularly when using collector ring bodies fitted with carbon rings in encased motors, to be used for example in aggressive or noxious atmospheres, difficulties are known to present themselves insofar as the heat of the collector rings, which is generated during the operation, and that can rise far beyond the admissible limit values, has to be drawn away from the motors.

This is all the more important because the spark behavior and efficiency of the entire collector ring body is endangered on account of the different heat-expansion coefficients of the used materials. It has been attempted in the past to solve this technical problem in various manners and by different approaches.

Devices became known in which individual cylindrical support body parts are used between the body proper and the carbon collector rings, in lieu of a compact body, thereby completely to compensate the different expansion coefficients. The support body parts consist of cylindrical hub portions having bead-shaped projections symmetrically disposed about their peripheries, the outer surfaces of the projections constituting the collector ring seats.

The number of the seats will correspond to that of the used current conducting and tensioning bolts. Collector ring bodies of this construction satisfy the requirements during the operation of the electric motors and are particularly insensitive to the effects of the different expansion coefficients of the two materials, owing to their small share on contact surfaces between supporting body and carbon collector rings, but they require substantial technological expenditure during the manufacturing process.

For the manufacture of the support body parts alone a complicated shape is necessary. Different dimensions of the collector ring bodies and different numbers of individual collector rings require differently built support body parts and shapes for their manufacture so that the same remains uneconomical in spite of technological advantages.

There is also known a collector ring arrangement for high current loads where however surface ground contacts are used which are enclosed on their front surfaces, not bound by contacts, and on their outer surfaces, by an annular metal plate. A disadvantage in the use of such arrangements is the required complete rebuilding of the electric motors to which they are fitted.

It is an object of the invention, with respect to the inventive collector ring bodies, to make use of the technical advantages achieved so far, and to reduce the technical requirements when making and applying collector ring bodies with non-metallic collector rings, capable of withstanding substantial electric and thermal strains.

It is another object of the invention to provide a collector ring body construction for high-speed encased electric motors, which provides for good heat withdrawal with simultaneous compensation of the differential expansion conditions of the individual materials, and renders economical the manufacture of all required kinds and sizes of collector ring bodies by making use of constructive expendients.

The objects are solved according to the most important features of the present invention by providing supporting or securing caps, sleeves or rings made of beryllium-oxide containing cements, thermosetting or thermoplastic materials, for heat dissipation on the front surfaces of the collector rings, the caps or rings touching the collector rings along surface areas, or being at least partly rigidly connected therewith. The caps or rings are in direct thermal contact with a cylindrical support hub or boss which also consists of beryllium-oxide containing cements, thermo- or duoplastic materials.

The collector rings as well as the supporting caps or rings are received on the hub which has in its wall, starting from one side, axially disposed slots, or passages that terminate at the seating surfaces of the collector rings, at their envelopes, for receiving band-shaped connecting elements which make electrical contact with the collector rings.

In the case of collector ring bodies which are exposed only to small thermal stresses, it is sufficient to dispose the attached caps or rings only on the outer front surfaces of the collector rings which limit the contact surfaces of the collector ring body while spacer rings or sleeves made of insulating material and engaging the carbon collector rings are disposed between the individual rings, the sleeves thus additionally protecting the collector rings against radial forces.

In accordance with the invention the supporting caps which limit the collector ring body can also be provided with a cylindrical sleeve in a central bore while a sleeve-shaped extension supplements the required length of the entire support hub in the collector ring body. Such extensions may also have passages or slots for receiving the band-shaped connecting elements which contact the collector rings.

According to further features of the invention, for purposes of heat dissipation, spacing, mutual insulation and simultaneous protection against centrifugal forces, the caps may be provided only on the outer surfaces of the collector rings, which surfaces limit the contact areas of the collector ring body, while insulating spacer rings or sleeves are concentrically disposed between the collector rings, and rigidly connected therewith.

The band-shaped connecting elements or flags for current conduction are secured to the inner peripheries of the collector rings by known contacting procedures; some of them may be axially bent or cranked so as to provide the required insulating distances, the connecting elements protruding from the body on one side of the assembly.

According to further features of the invention the support hub is made with a beryllium-oxide containing cement, thermosetting or thermoplastic material, preferably by centrifugal whirling action or casting, of the assembled unit including the collector rings, spacer rings or sleeves and caps. Carefully predetermined quantities of the centrifugally applied materials ensure the required bore, for receiving the usual armature shaft.

For larger collector ring body measurements the invention provides a cylindrical body to be inserted within the collector rings, thereby reducing the space or area that has to be filled by centrifuging.

For purposes of inner reinforcement, the entire collector ring body according to the invention can be impregnated with a binder, for example a hardenable resin compound.

According to the invention, one or both of the concentric spacer rings or sleeves can be provided in a perforated or air-permeable form for avoiding heat build-up.

Additionally, an electrically insulating, heat-conducting material can be applied between the concentric spacers, preferably in the form of an organically or inorganically bound beryllium-oxide material.

Collector ring bodies of the described kind can be produced economically and without difficulties, in all sizes and designs. Their construction excels in the bodies' capacity to withstand considerable thermal stresses.

The intensive contact of the collector rings, where heat develops, by the caps on the side surfaces, by the support hub in the central bore, as well as the excellent thermal contact between the caps and the hub proper, achieved by the particular construction, result in quick heat dissipation by way of the armature shaft, away from the encased motor housing.

This effect is considerably enhanced by the application of beryllium-oxide containing materials since they exhibit high heat conductivity as well as good insulating properties. By using simple caps, rings and sleeves, as well as through the application of a centrifugal or casting process, the component parts of the inventive collector ring bodies can be produced in a simple manner.

From the point of view of insulation the inventive construction offers considerable advantages since the band-shaped connecting elements are fully embedded in the insulating hub and/or the insulating centrifuged materials. Owing to the rigid connection between caps, spacer rings or sleeves and collector rings, centrifugal forces are substantially counteracted.

Other objects and many of the attendant advantages of the invention will be readily appreciated as the same becomes better understood by reference to the following detailed description, when considered with the accompanying drawings, wherein FIG. 1 is an end view of a first exemplary embodiment of the inventive collector ring bodies;

FIG. 2 is a vertical section taken along line 2 — 2 of a second exemplary embodiment shown in FIG. 2a;

FIG. 3 shows a different vertical section, along line 3 — 3 of a third exemplary embodiment shown in FIG. 3a;

FIG. 6 is a side view of the body shown in FIGS. 5 and 5a; and

In the following, various preferred, exemplary embodiments of the inventive collector ring bodies will be described, of which three embodiments relate to three-part arrangements, that is with three collector rings, while the fourth, as well as a modification thereof, is shown in a two-part arrangement, as will be explained in more detail.

Figure 1:
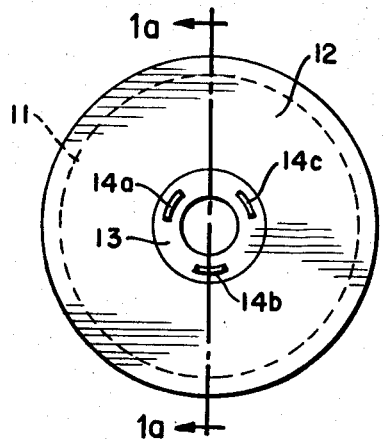
FIG. 1a is a vertical section of the body shown in FIG. 1, taken along line 1a - 1a thereof.
Figure 1A:
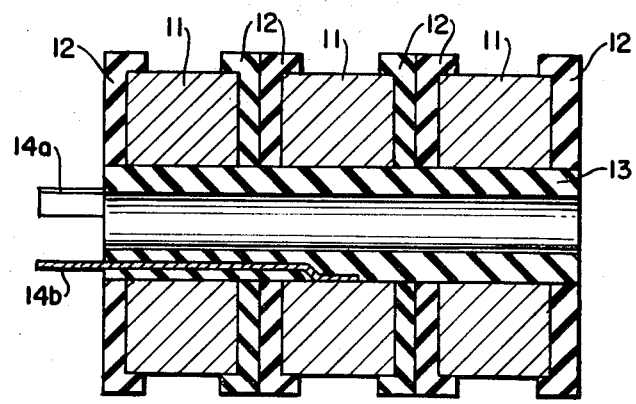

The first embodiment is shown in FIGS. 1 and 1a, with three substantially coaxial collector rings 11 of a non-metallic material, for example carbon, each being flanked on its sides by a pair of caps 12 made, in accordance with the invention, from beryllium-oxide containing thermosetting or similar material. Peripheral collars of the caps 12 cover respective portions on the contact surfaces of the enclosed rings 11, as shown, while slightly protruding therebeyond.

Central bores of both rings 11 and caps 12 lodge a cylindrical support hub or boss 13 which is preferably also made of a beryllium-oxide containing thermosetting material. The walls of hub 13 have, starting from one end, substantially axial passages therein, for receiving each a connecting element or flag as shown at 14a, 14b, 14c, respectively. FIG. 1 shows that the passages are offset by 120° and that the connecting elements are, as a matter of example, in the form of band-shaped contact laminae. Each of them makes good electrical contact with one of the rings 11, at their seats about the central hub 13, as shown in FIG. 1a for element 14b.

Figure 2:
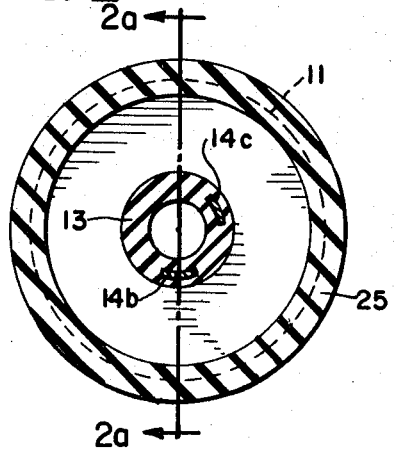
Figure 2A:
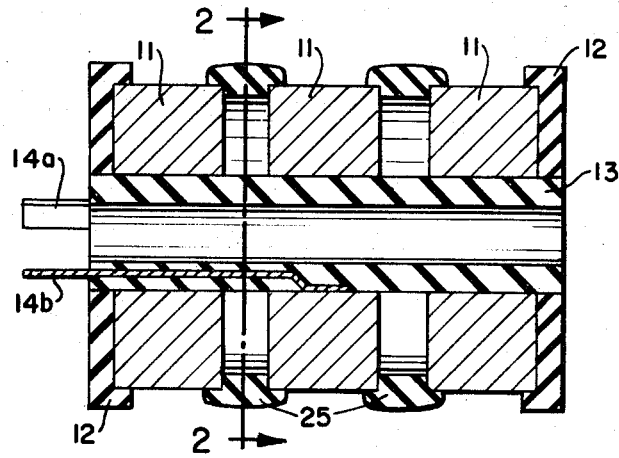
FIG. 2a is a vertical section of the body shown in FIG. 2, taken along line 2a — 2a thereof.

The second illustrated embodiment (FIGS. 2 and 2a) is a collector ring body which is not exposed to high thermal requirements, and thus it is sufficient to use caps 12 only for flanking the outer surfaces or sides of the two outermost rings 11 while between the latter, spacer rings 25 are used, as shown in FIG. 2a. The arrangement of the passages in support hub 13 and connecting elements 14a, 14b, 14c is substantially the same as in the first embodiment. It should be noted however that element 14a does not appear in FIG. 2 because it is a section taken beyond (to the right-hand side) of the first ring 11 with which it is in electrical contact.

Figure 3:
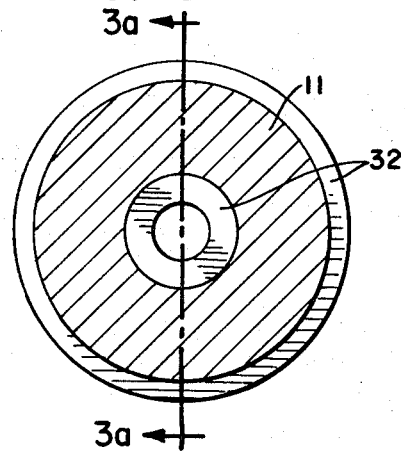
Figure 3A:
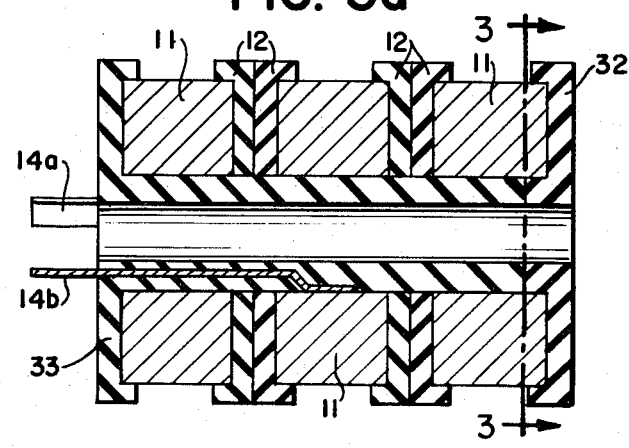
FIG. 3a is a vertical section of the body shown in FIG. 3, taken along line 3a — 3a thereof.

FIGS. 3 and 3a show a third exemplary embodiment with collector rings 11 and caps 12 substantially as in FIGS. 1, 1a, but including a central sleeve-shaped support hub 33 which incorporates, for example on its left-hand side, as shown, a projection similar to one of the caps, and on the opposite, e.g. right-hand side, a sleeve extension 32. Connecting elements 14a, 14b, 14c are again inserted in respective passages of the support hub, arranged at 120° each (when there are three collector rings in the body). The connecting elements do not appear in FIG. 3 since its section line falls beyond (to the right-hand side) of all three rings 11.

Figure 4:
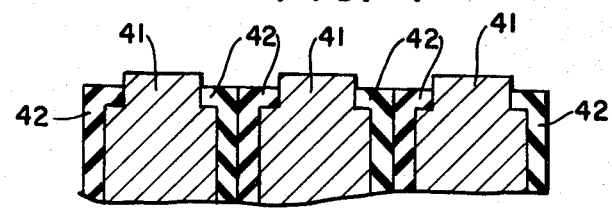
FIG. 4 is a partial sectional view, similar to any of the preceding FIGS. 1a, 2a and 3a, of a modification.

FIG. 4 constitutes a modification of the preceding embodiments insofar as collector rings 41 are each flanked by a pair of caps 42, the running or contact surfaces of the former protruding somewhat beyond the outer peripheries of the latter, in contradistinction to the previous arrangements where it was the caps 12, spacer rings 25 and the hub and sleeve extension combination 32, 33 which protrude beyond the ring contact surfaces.

It will be understood by those skilled in the art that not only the embodiment of FIGS. 1, 1a can be designed with cut-back rings 41 (in lieu of rings 11 shown therein), and somewhat shorter caps 42 (instead of protruding caps 12), but the same arrangement can be used in the second and third embodiments disclosed herein, and the fourth to be discussed hereinafter, considering that spacer rings 25, on the one hand, as well as support hub 33 and its sleeve extension 32, on the other, can also be made along the lines of the modification shown in FIG. 4, although not specifically illustrated.

In FIG. 2a, spacer elements 25 have been shown in the form of rings but, it should also be understood, they might be disk-shaped, similar to caps 12, only with two lateral noses, which would be fully compatible with the arrangement shown in FIGS. 2, 2a.

Figure 5:
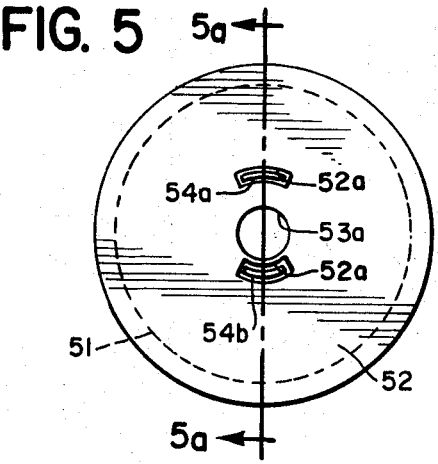
FIG. 5 is an end view of a fourth exemplary embodiment of the inventive collector ring bodies.
Figure 6:
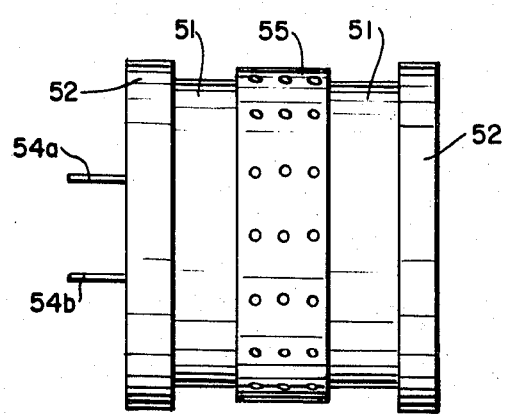
Figure 7:
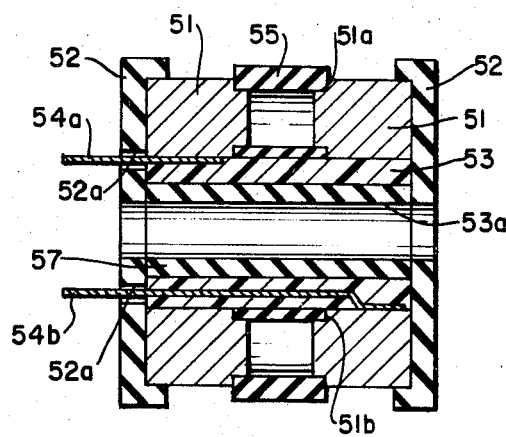
FIG. 7 is a vertical sectional modification of the fourth body embodiment.

As mentioned before, the fourth embodiment, shown in FIGS. 5, 5a and 6, and a modification thereof in FIG. 7, illustrates an assembly with only two circuits and associated collector rings although, it will be understood, a similar arrangement could be provided for three collector rings (the same way as the previously described embodiments could also be used for another number of rings, other than three, as shown as a matter of example).

Figure 5A:
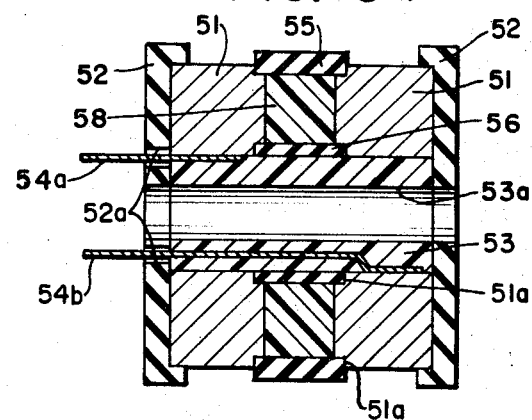
FIG. 5a is a vertical section of the body shown in FIG. 5, taken along line 5a — 5a thereof.

The inventive fourth collector ring body includes collector rings 51 of a non-metallic material, with caps 52 only on their outer sides, and having a support hub 53 provided between caps 52, as will be explained somewhat later in more detail. One of the caps 52 has passages or openings 52a therein to accommodate respective connecting elements 54a, 54b, each making electrical contact (e.g. by the application of an electrically conductive adhesive) with the seat of one of the rings 51, as shown in FIG. 5a.

Concentrically disposed spacer rings or sleeves 55, 56, made from an insulating material, immobilize rings 51 and assure a predetermined distance therebetween. They preferably engage respective inner and outer circumferential recesses 51a in caps 51, which arrangement protects the assembly against centrifugal forces encountered during operation of the motors. Caps 52 hold rings 51 in an axial direction on account of their somewhat protruding noses, as shown.

The assembly of the fourth embodiment, including the described rings 51, caps 52, hub 53, spacer rings 55, 56 and the embedded connecting elements 54a, 54b, is produced by the centrifugal application or casting of a beryllium-oxide containing cement, thermosetting or thermoplastic material, the desired inner diameter 53a of hub 53 being achieved by an appropriate dosage of the centrifuged materials, for the passage of an armature shaft (not shown). The area to be filled with the materials that are whirled onto the assembly is delimited by the caps 52, the inner surfaces of the rings 51, and the inner spacer ring 56 which engages the recesses provided on the inwardly facing peripherial portions of the two rings, as explained before.

From here on, modifications of the fourth embodiment will be described. For collector ring bodies of substantial diameters it is recommended, for example, to reduce the space to be centrifuged or cast, by the application of a sleeve-shaped body or insert 57 (see FIG. 7) which is individually inserted in hub 53, as shown.

It has been found particularly advantageous, for removing or dissipating heat from the rotating assembly, to use an electrically insulating, heat-conductive material or member 58, embedded between rings 51 and concentric spacer rings 55, 56 (see FIG. 5a). Member 58 is preferably made from an organically or inorganically bound beryllium-oxide material. It will be seen that FIG. 7 omits, as an alternative, the just described insulating member 58, thus leaving an annular gap between spacer rings 55, 56.

While ring 56 (shown in both FIGS. 5a and 7) has a continuous, non-interrupted surface, outer ring 55, which limits the space to be centrifuged, can be provided with a perforated surface, to avoid heat build-ups, as shown in FIG. 6 (this detail being however omitted from FIG. 5a, and from the modification of FIG. 7).

It should also be noted that in each of the preferred exemplary embodiments described in this application one of the connecting elements or flags (e.g. 14a, 54a) may be rectilinear while the remaining one, two or more elements (e.g. 14b and 14c, 54b) may be given a cranked shape for easier embedding in the respective support hubs.

For purposes of inner reinforcement, all collector ring bodies of this invention may be impregnated with or embedded in a binder or hardenable resin compound (not illustrated).

It should be understood, of course, that the foregoing disclosure relates only to preferred, exemplary embodiments of the invention, and that it is intended to cover all changes and modifications of the examples described which do not constitute departures from the spirit and scope of the invention.

What we claim is:

1. A collector ring body for encased high-speed electric motors, comprising, in combination, substantially cylindrical insulating hub means, at least two non-metallic collector rings disposed about said hub means, means for securing said rings and at least partly rigid therewith, also disposed about said hub means, said rings have peripheral grooves about at least one of their inner and outer circumferences, said grooves being engaged by at least one of said spacers for protection against centrifugal forces and a hardenable resin compound in which the collector ring body is embedded for purposes of inner reinforcement, wherein at least one of said hub means and said securing means is made from a filling material selected from the group consisting of beryllium-oxide containing cements, thermosetting and thermoplastic materials, which provide good heat dissipation as well as electrical insulation.

2. The collector ring body as defined in claim 1, wherein said hub means has substantially axial passages, for receiving therein electrical connecting elements in a number corresponding to that of said rings.

3. The collector ring body as defined in claim 1, wherein said securing means includes a pair of caps flanking each of said rings.

4. The collector ring body as defined in claim 1, wherein said securing means includes at least one spacer element between a pair of said rings, said element having projecting peripheral portions for axially restraining said pair of rings with respect to said hub means.

5. The collector ring body as defined in claim 1, wherein said hub means includes a sleeve-shaped hub and an extension at one end of said hub, while said securing means includes caps engaging the sides of some of said rings, said sleeve-shaped hub and said extension having cap-shaped projections which flank the outer sides of the outermost ones of said rings.

6. The collector ring body as defined in claim 1, wherein said securing means includes caps engaging the sides of said rings, the contact surfaces of the latter protruding somewhat beyond the outer peripheries of said caps.

7. The collector ring body as defined in claim 1, wherein said securing means includes a pair of concentric spacers between a pair of said rings, and a pair of caps flanking the outer sides of the outermost ones of said rings.

8. A collector ring body for encased high-speed electric motors, comprising, in combination, substantially cylindrical insulating hub means, at least two non-metallic collector rings disposed about said hub means, and means for securing said rings and at least partly rigid therewith, also disposed about said hub means, said securing means including a pair of concentric spacers between a pair of said rings, and a pair of caps flanking the outer sides of the outermost ones of said rings, wherein said rings have peripheral grooves about at least one of their inner and outer circumferences, said grooves being engaged by at least one of said spacers for protection against centrifugal forces, and wherein at least one of said hub means and said securing means is made from a filling material selected from the group consisting of beryllium-oxide containing cements, thermosetting and thermoplastic materials, which provide good heat dissipation as well as electrical insulation.

9. The collector ring body as defined in claim 7, wherein at least one of said spacers has an air-permeable outer surface to avoid heat build-ups.

10. The collector ring body as defined in claim 7, further comprising an electrically insulating, heat-conductive member inserted between said spacers.

11. The collector ring body as defined in claim 10, wherein said member is made from a beryllium-oxide material.

12. The collector ring body as defined in claim 7, wherein said filling material is cast in the space formed by said caps, the inner surfaces of said rings and the inner one of said spacers.

13. The collector ring body as defined in claim 8, wherein said filling material is cast in the space formed by said caps, the inner surfaces of said rings and the inner one of said spacers, and further comprising a sleeve-shaped insert applied in the inner bore of said hub means.

* * * * *